United States Patent [19]

Junkers

[11] Patent Number: 5,499,558
[45] Date of Patent: Mar. 19, 1996

[54] FLUID OPERATED TOOL FOR ELONGATING AND RELAXING A THREADED CONNECTOR

[76] Inventor: John K. Junkers, 7 Arroehead La., Saddle River, N.J. 07540

[21] Appl. No.: 250,035

[22] Filed: May 27, 1994

Related U.S. Application Data

[63] Continuation-in-part of Ser. No. 153,217, Nov. 16, 1993, abandoned, which is a continuation of Ser. No. 879,342, May 7, 1992, Pat. No. 5,318,397.

[51] Int. Cl.$^6$ .................................................. B25B 13/46
[52] U.S. Cl. .......................................... 81/57.39; 254/29 A
[58] Field of Search ............................. 81/57.38, 57.39; 254/29 A; 411/329

[56] References Cited

U.S. PATENT DOCUMENTS

| | | | |
|---|---|---|---|
| 4,201,099 | 5/1980 | Junkers . | |
| 4,336,727 | 6/1982 | Junkers . | |
| 4,368,655 | 1/1983 | Junkers . | |
| 4,844,418 | 7/1989 | Cole ................................. | 81/57.38 X |
| 5,140,874 | 8/1992 | Junkers ............................. | 81/57.39 |

Primary Examiner—James G. Smith
Attorney, Agent, or Firm—Michael J. Striker

[57] ABSTRACT

A fluid operated tool for elongating and relaxing a threaded connector has a fluid operated drive having an axis, a non-rotatable driving part driven by the fluid operated drive, and a reaction part, wherein the reaction part includes a non-rotatable tool element of the tool provided with first element for engaging non-rotatably a threaded connector, the driving part includes a rotatable tool element rotatable about an axis of the threaded connector and having second element for engaging the rotatable tool element with the non-rotatable tool element, and an intermediate element arranged between the non-rotatable tool element and the rotatable tool element, and being formed so that it engages with the non-rotatable tool element so as to be non-rotatable as well while the rotatable tool element freely turns relative to the intermediate element, whereby when the rotatable tool element is turned around the axis the non-rotatable tool element only moves in an axial direction but does not rotate and therefore pulls a threaded connector in the axial direction.

8 Claims, 3 Drawing Sheets

FLUID OPERATED TOOL FOR ELONGATING AND RELAXING A THREADED CONNECTOR

CROSS REFERENCE TO RELATED APPLICATIONS

This application is a continuation-in-part of application Ser. No. 153,217 filed on Nov. 16, 1993 abandoned, which in turn is a continuation of application Ser. No. 879,342 filed on May 7, 1992 U.S. Pat. No. 5,318,397.

BACKGROUND OF THE INVENTION

The present invention relates to fluid operated tools, particularly for elongating and relaxing of threaded connectors.

Fluid operated wrenches are known in many modifications. Some fluid operated wrenches include a hydraulic drive, a driving part which engages a threaded connector and is driven by the drive so that by actuating of the drive the driving part turns the threaded connector, and a reaction part adapted to counteract a force created during turning of the threaded connector. The reason for the provision of the reaction part is that during turning of the threaded connector a force is created tending to turn the tool in the opposite direction. It is necessary to counteract this force, which has been done in existing tool by the corresponding reaction part. In known fluid operated tools such as for example the fluid operated tools disclosed in my U.S. Pat. Nos. 4,201, 099, 4,336,727, 4,368,655 and others, the reaction part is formed by an abutment element which is provided on the housing and adapted to abut against a stationary object located near the threaded connector to be tightened or loosened. While such a reaction part provides an efficient counteraction to the force tending to turn the tool in the opposite direction, it has some disadvantages. It is always necessary to have a neighboring object in order to abut against it by the reaction part on the one hand. On the other hand, the abutment against a neighboring object was always performed in these constructions in such a way that some parts which transmit the movement of the hydraulic drive to the driving part and also the parts in the driving part are subjected to forces which can break these parts. It is therefore believed to be clear that further modifications and improvements of such fluid operated tools are desirable.

SUMMARY OF THE INVENTION

Accordingly, it is an object of the present invention to provide a fluid operated tool which avoids the disadvantages of the prior art.

In keeping with these objects and with others which will become apparent hereinafter, one feature of the present invention resides, briefly stated, in a fluid operated tool which has a hydraulic drive, a driving part driven by the hydraulic drive, and a reaction part, wherein the reaction part includes a non-rotatable tool element provided with first engaging means for non-rotatably engaging a threaded connector, the driving part includes a rotatable tool element rotatable about an axis of the threaded connector and having second engaging means for engaging said rotatable tool element with said non-rotatable tool element, and an intermediate element arranged between said non-rotatable tool element and said rotatable tool element and formed so that it engages with said non-rotatable tool element so as to be non-rotatable as well, while said rotatable tool element freely turns relative to said intermediate element, whereby when said rotatable tool element is turned around said axis, said non-rotatable tool element only moves in an axial direction but does not rotate and therefore pulls a threaded connector in the axial direction.

When the fluid operated tool is designed in accordance with the present invention it eliminates the disadvantages of the prior art and provides for the above mentioned highly advantageous results.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
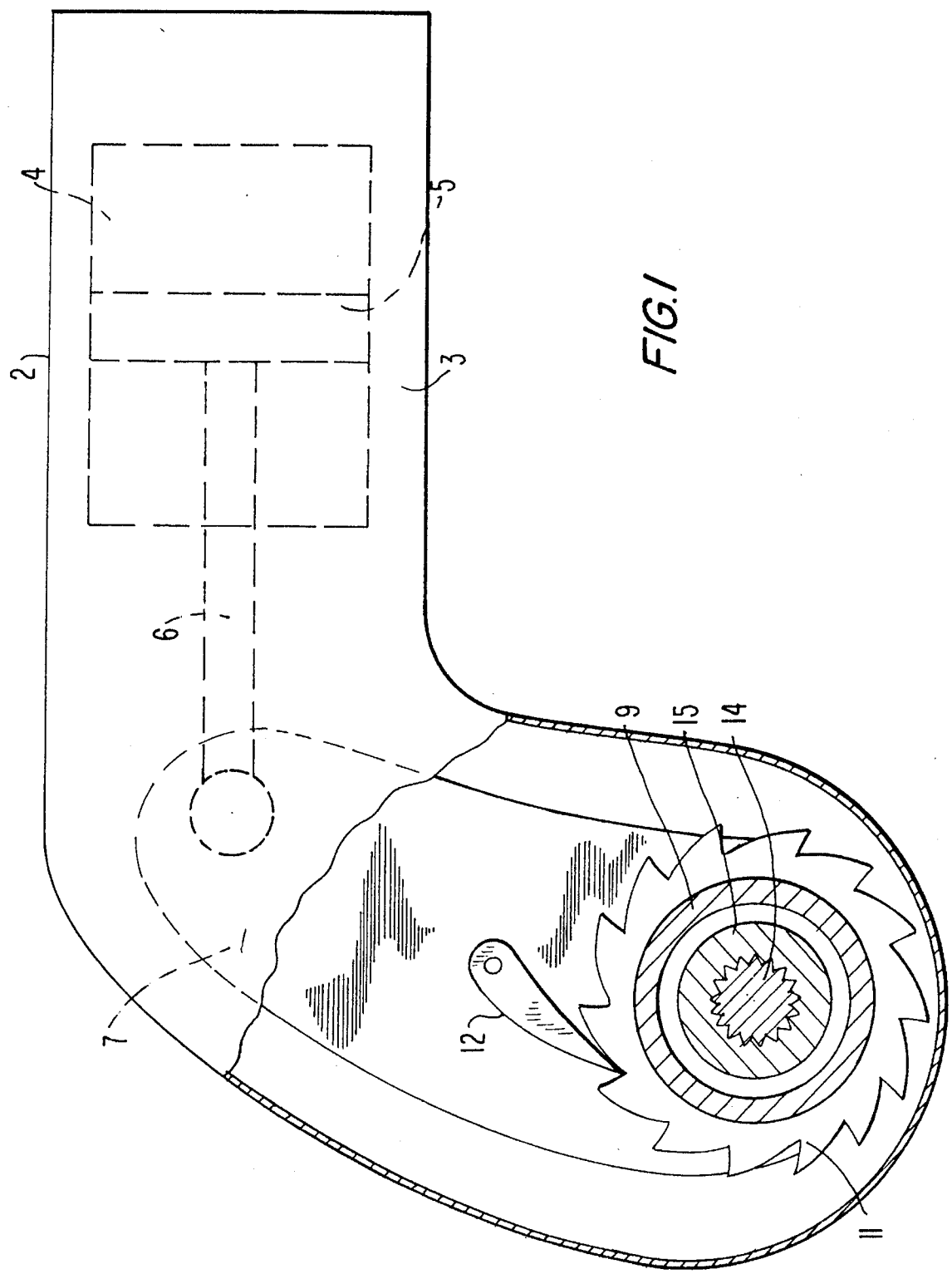
FIG. 1 is a side view of a fluid operated tool in accordance with the present invention.

A fluid operated tool in accordance with the present invention is used for elongating and relaxing a threaded connector such as for example a threaded stud 1. The fluid operated tool has a housing identified with reference numeral 2. Fluid operated drive means are accommodated in the housing 2 and conventionally include a cylinder 4, a piston 5 reciprocatingly movable in the cylinder under the action of a working fluid medium, a piston rod 6 extending outwardly beyond the cylinder 4 and pivotally connected with at least one driving plate 7 for turning the latter.

Figure 2:
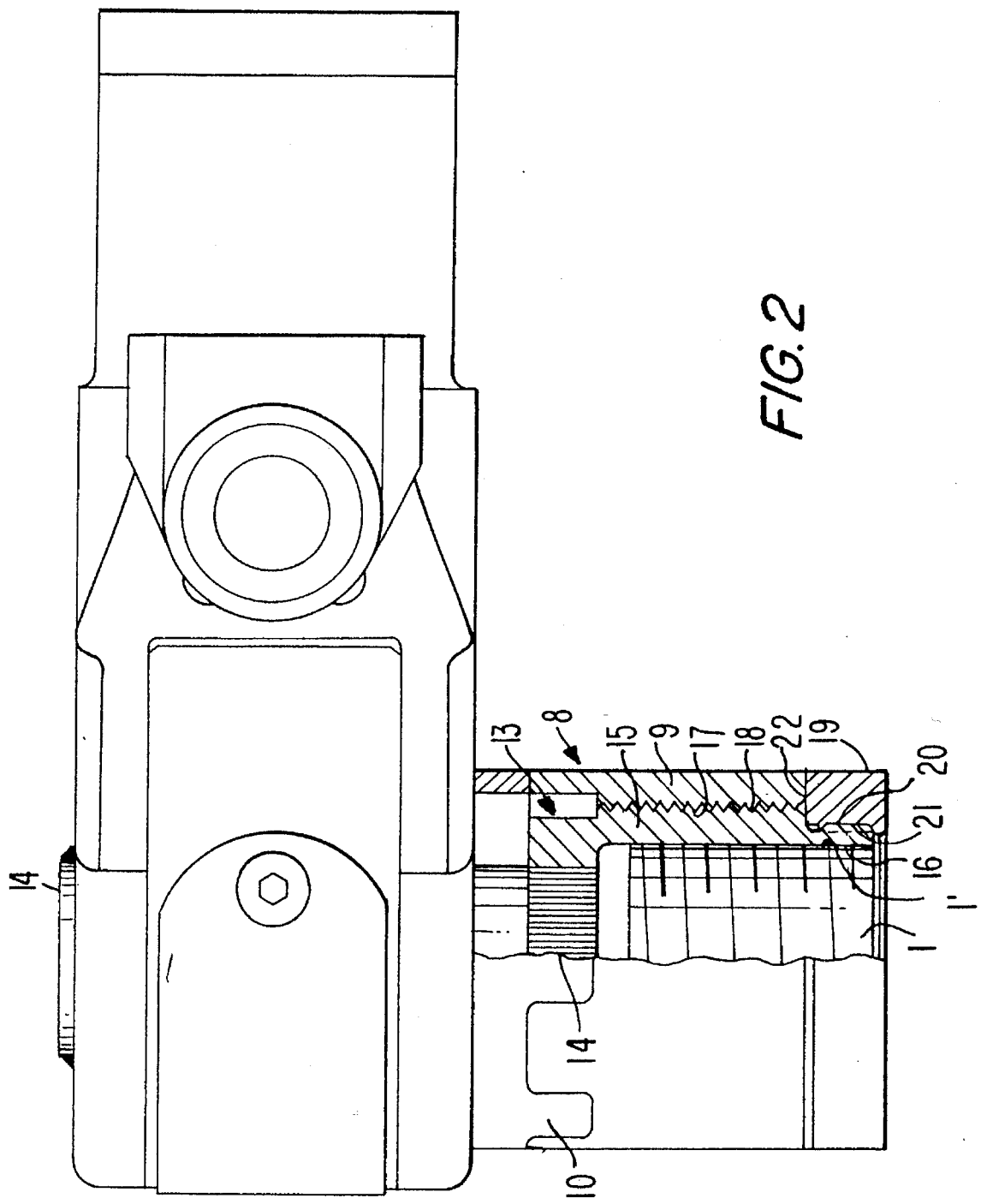
FIG. 2 is a plan view of the fluid operated tool of FIG. 1.

The fluid operated tool in the embodiment shown in FIGS. 1 and 2 further has a non-rotatable or a reaction part identified with reference numeral 13. The reaction part includes a non-rotatable projection 14 which for example is non-rotatably mounted on the housing 2 of the tool and has outer splines, and an inner non-rotatable sleeve 15 having an upper portion in FIG. 2 provided with inner splines engaging with the outer splines of the projection 14. The inner sleeve 15 has an inner surface provided with first engaging means 16 formed for example as a thread engaging with an outer thread 1' of the stud 1.

The fluid operated tool further has a driving part which includes a rotatable tool element identified with reference numeral 8. The rotatable tool element 8 can be formed as an outer sleeve 9 connected with a coaxial projection 10 of a ratchet wheel 11 which is intermittently turnable by a pawl 12 pivotally mounted on the driving plate 7. The outer sleeve 9 has an inner surface provided with second engaging means 17 formed for example as a thread engageable with third engaging means 18 formed for example as a matching thread on the outer surface of the inner sleeve 15. The threads 1', 16 and 17, 18 have opposite directions.

The fluid operated tool further has an intermediate element identified with reference numeral 19. The intermediate element 19 is formed as a ring which has for example inner splines 20 engaging with outer splines 21 of a lower axial portion of the inner sleeve 15. It also has an upper end surface 22. As can be seen from the drawings, the inner sleeve 15 has five surfaces cooperating with other parts of the tool and subjectable to friction, in particular the surface of its inner thread 16, the surface of its outer thread 18, the surface of its splines 21, the surface of its splines cooperating with the projection 14, the lower end surface abutting against a not shown flange in which the stud 1 is screwed. In contrast, the outer sleeve 8 has only three surfaces which are subjectable to friction, in particular the surface of its inner thread 17, the surface cooperating with the projection 10, and the lower end surface which is in free contact with the upper end surface 22 of the intermediate element 19.

During the operation of a fluid operated tool applied on the stud 1, the inner sleeve 15 engages with the stud 1, it does not rotate since it is connected with the non-rotatable projection 14 of the housing 2, and prevents rotation of the stud. Under the action of the fluid operated drive the pawl 12 turns the ratchet 11 which in turn by its projection 10 turns the outer sleeve 9, the outer sleeve 9 abuts with its lower end surface against the end surface 22 of the intermediate element 19 and freely turns relative to the latter, the inner sleeve 15 is held non-rotatably by the projection 14 and is displaced only axially in response to the rotation of the outer sleeve 9, and as a result it displaces axially the stud 1 for elongating or relaxing the stud 1, depending on the direction of action of the fluid operated drive.

Figure 3:
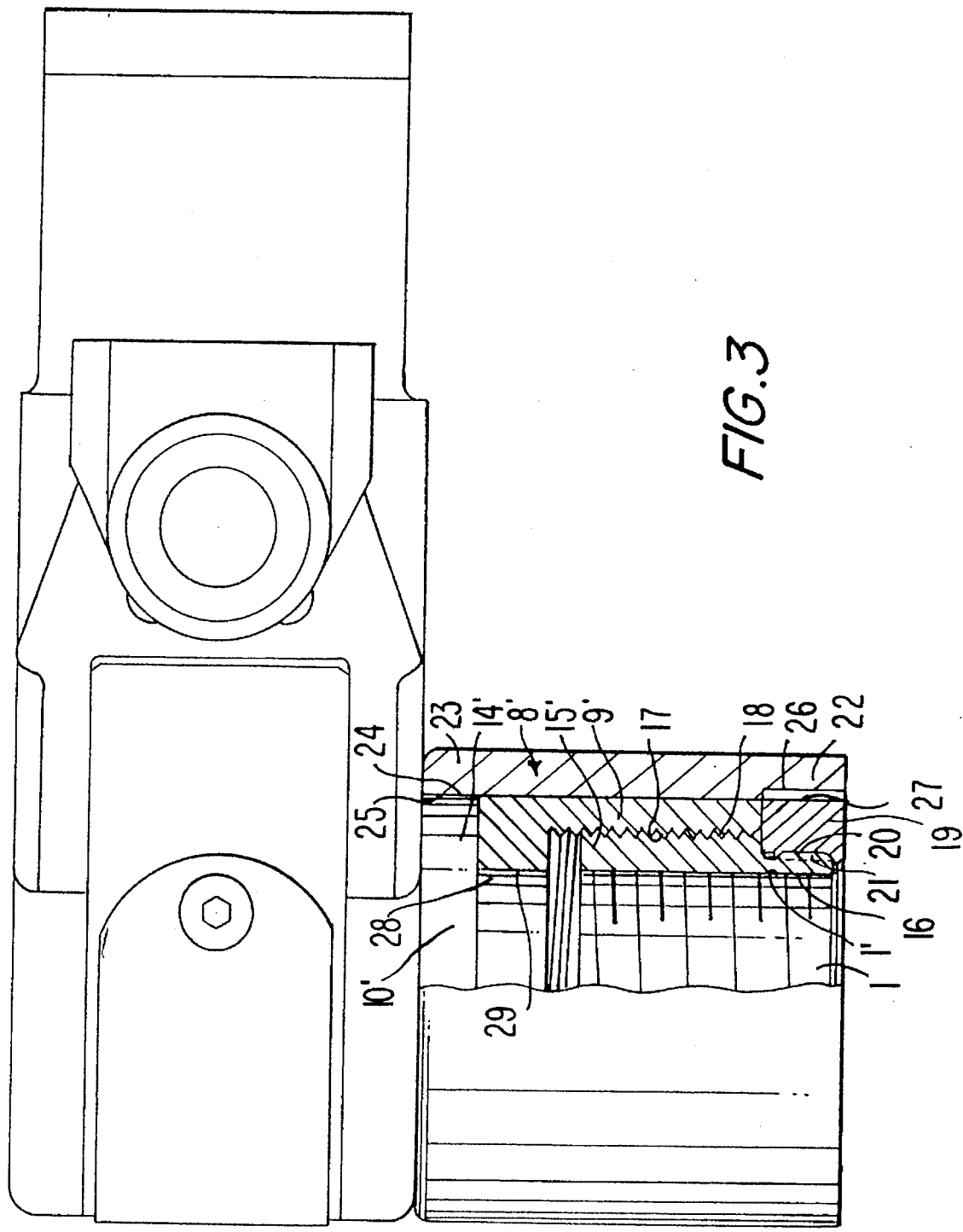
FIG. 3 is a view showing a fluid operated tool in accordance with a further embodiment of the present invention.

The fluid operated tool in accordance with the another embodiment of the present invention is shown in FIG. 3. In this embodiment the non-rotatable or the reaction part of the tool has, in addition to the inner sleeve 15', a socket 23 provided with inner splines 24 which engage with outer splines 25 of the non-rotatable projection 14' which for example is non-rotatably mounted on the housing 2 of the tool. In the lower part in FIG. 3 the socket 23 has inner splines 26 which engage with outer splines 27 of the intermediate element 19. The inner sleeve 15' does not have an upper part engageable with another part of the tool as in the first embodiment. When the reaction part is designed in accordance with the embodiment shown in FIG. 3, the inner sleeve 15' cannot rotate since it is non-rotatably engaged with the intermediate element 19 through the splines 20, 21, the intermediate element 19 is further non-rotatably engaged through the splines 26, 27 with the socket 23, and the socket 23 is non-rotatably engaged through the splines 24, 25 with the non-rotatable projection 14' of the tool.

The driving part of the tool in the embodiment of FIG. 3 includes the rotatable tool element 8' formed as an outer sleeve 9'. In this embodiment the outer sleeve 9' has inner splines 28 which engage with outer splines 29 of a coaxial projection 10' of the ratchet wheel 11 which in turn is intermittently turnable by a pawl 12 mounted on the driving plate 7.

During the operation of the fluid-operated tool of the embodiment shown in FIG. 3, the inner sleeve 15' engages with the stud 1, it does not rotate since it is connected with the non-rotatable intermediate element 19 which in turn is connected with the non-rotatable socket 23, and prevents rotation of the stud 1. Under the action of the fluid operated drive, the pawl 12 turns the ratchet 11 which in turn by its projection 10' turns the outer sleeve 9', the outer sleeve 9' abuts with its lower end surface against the end surface 22 of the intermediate element 19 and freely turns relative to the latter, the inner sleeve 15' is non-rotatable and at the same time is displaced axially in response to the rotation of the outer sleeve 9', and as a result it displaces axially the stud 11 for elongating or relaxing the stud 1, depending on the direction of action of the fluid operated drive.

It will be understood that each of the elements described above, or two or more together, may also find a useful application in other types of constructions differing from the types described above.

While the invention has been illustrated and described as embodied in a fluid operated tool for elongating and relaxing a threaded connector, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A fluid operated tool for elongating and relaxing a threaded connector, comprising a hydraulic drive; a driving part driven by said hydraulic drive; a non-rotatable reaction part, said reaction part including a non-rotatable tool element provided with first engaging means for non-rotatably engaging a threaded connector, said driving part including a rotatable tool element rotatable about an axis of the threaded connector and having second engaging means for engaging said rotatable tool element with said non-rotatable tool element; and an intermediate element arranged between said non-rotatable tool element and said rotatable tool element and formed so that it engages with said non-rotatable tool element so as to be non-rotatable as well while said rotatable tool element freely turns relative to said intermediate element, whereby when said rotatable tool element is turned around said axis said non-rotatable tool element only moves in an axial direction but does not rotate and therefore displaces a threaded connector in the axial direction.

2. A fluid operated tool as defined in claim 1, wherein said non-rotatable tool element is formed as an inner sleeve having an inner surface provided with said first engaging means and engaging by said first engaging means an outer surface of the threaded connector, said inner sleeve also having an outer surface provided with a third engaging means, said rotatable tool element being formed as an outer sleeve having an inner surface provided with said second engaging means which engage said third engaging means of said inner sleeve, said sleeves being coaxial with one another.

3. A fluid operated tool as defined in claim 2, wherein said intermediate element is formed as a ring having an inner surface provided with fourth engaging means which engage said outer surface of said inner sleeve, said ring also having an end surface, said outer sleeve having another end surface which is in contact with said end surface of said intermediate element during the free turning of said outer sleeve relative to said intermediate element.

4. A fluid operated tool as defined in claim 2, wherein said inner sleeve has more surfaces cooperating with other parts of the tool, while said outer sleeve has less surfaces cooperating with other parts of the tool.

5. A fluid operated tool as defined in claim 1; and further comprising a housing having a non-rotatable projection, said non-rotatable tool element being non-rotatably connected with said projection.

6. A fluid operated tool as defined in claim 2; and further comprising a housing having a non-rotatable projection, said inner sleeve being non-rotatably connected with said projection of said housing radially inwardly of said inner sleeve and said outer sleeve.

7. A fluid operated tool as defined in claim 2; and further comprising a housing having a non-rotatable projection; and a socket which is non-rotatably connected with said projection of said housing and also non-rotatably connected with said intermediate element.

8. A fluid operated tool as defined in claim 7, wherein said socket is located radially outwardly of said inner sleeve and said outer sleeve.

* * * * *